(No Model.)
A. SEARLS.
WHIP SOCKET.
No. 406,004. Patented June 25, 1889.
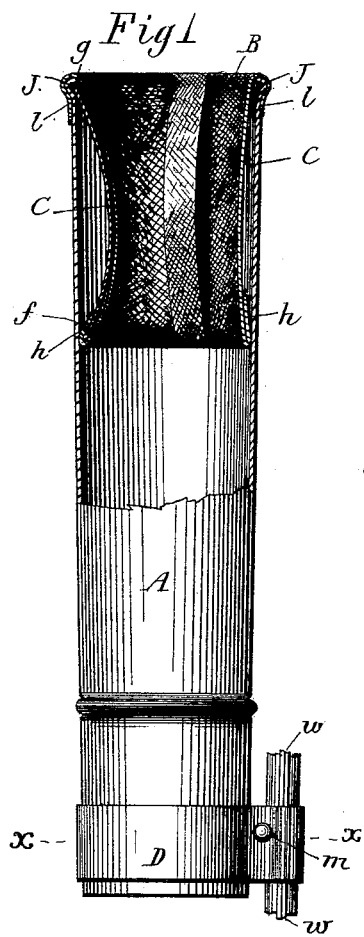
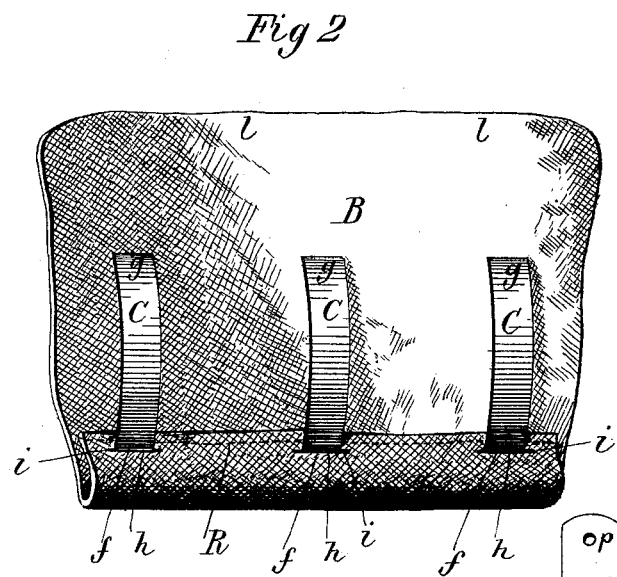
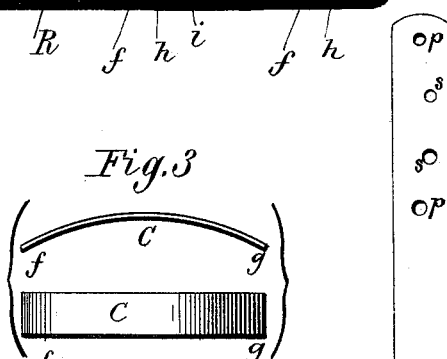
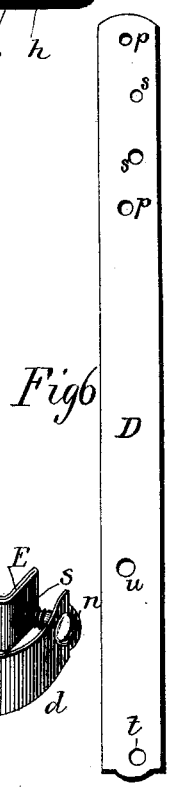
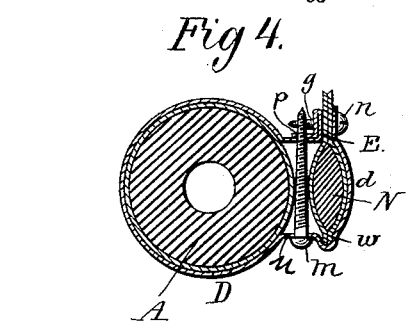
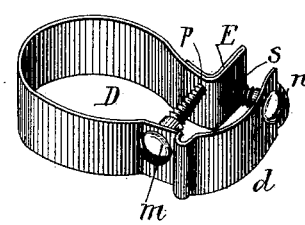
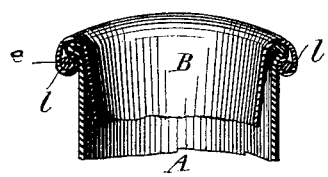
Witnesses
Frederick Woodruff
H. J. Lines
Inventor
Anson Searls
N. PETERS, Photo-Lithographer, Washington, D. C.

UNITED STATES PATENT OFFICE.

ANSON SEARLS, OF NEWARK, NEW JERSEY, ASSIGNOR TO THE SEARLS MANUFACTURING COMPANY, OF SAME PLACE.

WHIP-SOCKET.

SPECIFICATION forming part of Letters Patent No. 406,004, dated June 25, 1889.

Application filed June 4, 1888. Serial No. 276,169. (No model.)

*To all whom it may concern:*

Be it known that I, ANSON SEARLS, a citizen of the United States, residing at Newark, in the county of Essex, State of New Jersey, have invented certain new and useful Improvements in Whip Sockets and Fasteners, of which the following is a specification.

My invention relates to whip-sockets for carriages and the fasteners attaching the same to a carriage; and it consists in a whip-socket barrel provided with a top lining or mouth-piece and one or more springs held under the lining and so connected therewith that said springs and lining are held in position each one by the other; also, to a wire or cord by which said lining is fastened to the outside of the barrel, and a fastener consisting of a band with two screws only; also, in threaded holes at or near one end dodged each one on either side of a longitudinal line drawn through the band, the two screws entering said holes, all as hereinafter more fully set forth.

In the drawings herewith, Figure 1 shows the socket A, provided with fasteners D, cut away at the top to show a section of lining B and spring C. Fig. 2 shows about the blank form of a lining B, with the bottom turned up to form the pocket $h$. Fig. 3 is a side and front view of springs C. Fig. 4 is a sectional view of the fastener D, Fig. 1, at line $x\ x$, and of socket A. Fig. 5 is a perspective view of fastener D. Fig. 6 is the band D in blank form, with holes P, $s$, $u$, and $t$. Fig. 7 is a part of lining B at $l$, showing a wire or cord $e$.

The barrel A is made of wood or any suitable material, and is provided with a groove J, that receives the tops $g$ of springs C sufficiently to hold the springs from slipping up out of the socket. The lining B, made about the form shown to fit the socket-barrel, is provided with a hem $h$ at the bottom to receive the bottoms $f$ of springs C through slots $i$ between the stitching R, so they may be held up by the pockets. At the top $l$, when used in the barrel A, having a finishing-cover, it may be turned over the top and pasted to or otherwise attached to the barrel, as shown in Fig. 1, the finishing-cover usual in leather-covered whip-sockets covering the edge where it is pasted down.

When the lining B is used in barrels externally finished, it is turned over at $l$ in the form of a hem, and sewed or fastened down, and a wire or cord $e$ inserted in the hem and covered thereby, as shown in Fig. 7. After the lining is inserted in the socket the part $l$ is turned down over the top of the socket A, bringing a part of the hem under the wire $e$. The ends are then drawn together firmly and twisted or fastened together by any well-known means, holding the inside of the hem under the wire $e$ firmly against the socket, whereby it is held from slipping up and off of the same. The hem makes a finish to the lining, conceals the wire $e$, and with the externally-finished barrel makes a completed finished leather-lined whip-socket without other appliances or finish. It is left free at the bottom to move with the springs C, as presently described.

The springs C, one or more, made about the form shown in Fig. 3, interpose between the barrel and lining, and are inserted in pockets $h$, and the tops $g$ engage in groove J, or may be held down by the lining B where it turns over the top of the barrel, or be riveted or equivalently attached to the barrel, serving the same purpose as the groove J; but I prefer the groove J, as shown.

The lining B, made in tubular form by stitching or otherwise and the bottom of the springs C inserted in pockets $h$, is inserted in the mouth of the socket, and the tops $g$ engage with the groove J. The part $l$ of the lining is then attached to the top of the barrel in either manner, as above described.

The springs C, held down at the top $g$, are sufficiently connected with the lining B by the pockets $h$ to hold and move the lining left free with the springs. When a whip is inserted, the springs are compressed and the lower ends shoved down, the free end of the lining moving with the springs. When the whip is withdrawn, the lining is drawn upward by the friction of the whip against the springs in pockets $h$, and is held from coming out with the whip by the connection at $h$ with the springs. The free end of the lining while moving with the springs C holds them up, and the lining is also held down for all purposes. This method of holding the springs and the lining each with the other in that class of whip-sockets where the springs interpose between the lining and the barrel is in distinction to that shown in my Letters Patent No. 395,006, dated December 25, 1888, where the lining is firmly attached to and held at each end to the top and bottom of the socket, and the springs are held up by like pockets. The springs may be connected to the lining at $h$ by rivets or other equivalent means; but I prefer the pockets as an easy, expeditious, and efficient method of connection.

The fastener—preferably of metal, made of one piece of any desired width or thickness—is provided with two screws $n$, that attaches to the dash-rail, and $m$, that holds the band on the socket and tightens the parts, also with holes P and $s$ set partly each side of a longitudinal line, Figs. 5 and 6, so that when screws $m$ and $n$ pass through, the points will not impinge, but pass each by the other. At the other end is hole $t$ for screw $n$, that attaches the socket to the dash-rail. Near it is hole $u$ for the tightening-screw $m$. The band D is bent to the form of the barrel A, and a short part at holes P and $u$ set out about parallel from the socket and turn at right angles at E, so it may form a rest for the dash-rail and receive the screw $n$. It may also be made to conform to the dash-cover or hem $w$. The part $d$ embraces the dash-rail N, and the screw $n$, inserted in hole $s$, holds firmly the parts to the dash-rail. The tightening-screw $m$ may then be turned until the band D is drawn together between the socket and dash-rail until all parts are firmly held in place.

Aside from allowing the points of the screw to pass each other, another advantage is gained by dodging the holes P and $s$. When the screw $m$ is tightened, it twists the threaded parts on the screw $m$ obliquely, so as to cause the threads when fitted loosely, as in whip-socket fasteners, to hold firmer than in a direct pull. The screws $n$ in a measure act as pivots when the screw $m$ is tightened. These advantages are gained by the location of holes P and $s$.

The band D and screws $m$, attaching the band to the socket and the screws $n$ to the dash-rail, form an efficient fastener without any of the modifications herein described. Making the band conform to the hem $w$ is an advantage; but the efficiency of the fastener does not depend on it. The same is true of the two planes at P and $u$. They are an improved form of making it. It may be made as at P, Fig. 5.

The parts P and $s$ may be made separate from the band D and riveted or otherwise attached thereto, and perform in an equivalent manner the same office as when the entire band is made in one piece, as it would be substantially one piece for all the purposes designed. By this construction and combination of the band D in one piece and the two screws $m$ and $n$, I am enabled to produce a fastener efficient and durable in operation and adjustable to rails of different sizes by the tightening-screw $m$. I add also the advantage of the band conforming to the hem $w$ when made in one piece and the advantage resulting from the location of screw-holes P and $s$ so as to allow the screw-points to pass each other and incidentally twist, so as to hold firmly at the threaded hole P.

In Letters Patent No. 395,006, dated December 25, 1888, the application for which was filed simultaneously herewith, I have claimed a whip-socket barrel and a series of springs held therein by the lining, pockets, and grooves, as therein shown and described and claimed as follows: "A whip-socket barrel provided with a lining and a series of springs held therein by the lining, pockets, and grooves, as and for the purpose set forth." I therefore except such devices as therein set forth from the claims herein.

I disclaim any construction or combination shown in English patent to Cooper, No. 748, dated March 11, 1869.

Having described my invention, I desire to secure by Letters Patent—

1. The combination of a whip-socket barrel provided with an internal mouth piece or lining turned over and attached to the top of the barrel, and one or more springs interposed between said lining and barrel and held thereby, said lining being free and unattached at the lower end and held down by said springs, substantially as set forth.

2. The combination of a whip-socket barrel with an internal mouth piece or lining B, provided with a hem turned over the outside of the top of the barrel and held thereon by a cord or wire $e$, and one or more springs C, secured to said lining, substantially as and for the purpose set forth.

3. A whip-socket fastener consisting of a band D, that embraces the socket and forms a bearing for a dash-rail between the socket and the rail, in combination with a screw $n$, attaching the ends through holes $t$ and $s$ to a dash-rail, and a screw $m$, interposing between the rail and the socket and holding and adjusting the band by holes $u$ and P between the dash-rail and the socket, and tightening the band D around the socket and dash-rail by the screw $m$, substantially as set forth.

4. A whip-socket fastener consisting of a band provided with holes P and $s$, placed on opposite sides of a longitudinal line through the band, combined with screws $m$ and $n$, substantially as and for the purpose set forth.

ANSON SEARLS.

Witnesses:
ALPHEUS STRUBLE,
PHILEMON WOODRUFF.